US007152050B2

(12) United States Patent
Aoyama et al.

(10) Patent No.: US 7,152,050 B2
(45) Date of Patent: Dec. 19, 2006

(54) LEARNING SYSTEM CAPABLE OF PERFORMING ADDITIONAL LEARNING AND ROBOT APPARATUS

(75) Inventors: Kazumi Aoyama, Saitama (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 10/781,471

(22) Filed: Feb. 18, 2004

(65) Prior Publication Data
US 2004/0215463 A1 Oct. 28, 2004

(51) Int. Cl.
*G06K 9/00* (2006.01)
(52) U.S. Cl. .......................... 706/12; 706/61; 382/206
(58) Field of Classification Search ................... 706/12
See application file for complete search history.

(56) References Cited

FOREIGN PATENT DOCUMENTS

| JP | 7 213753 | 8/1995 |
|---|---|---|
| JP | 10 179941 | 7/1998 |
| JP | 11 154146 | 6/1999 |
| JP | 2001 300148 | 10/2001 |
| JP | 2002 160185 | 6/2002 |
| JP | 2002 219677 | 8/2002 |
| JP | 2003 44080 | 2/2003 |
| JP | 2003 255989 | 9/2003 |
| JP | 3529049 | 3/2004 |

OTHER PUBLICATIONS

Frank Lomker et al., A Multimodal System for Object Learning, Lecture Notes in Computer Science 2449, pp. 490-497, Berlin, Sep. 2002, Springer. □□*

Yoshizaki et al., Mutual Assistance between Speech and Vision for Human-Robot Interface, 2002 IEEE/RSJ, Oct. 2002, pp. 1308-1313.*

KycongJu Kim, Naoto Iwahashi, Sony Computer Science Labs Inc. "The algorithms for the acquisition of linguistic speech units based on integrating perceptual information" pp. 9-16.

Deb Roy, MIT Media Laboratory, "Integration of Speech and Vision Using Mutual Information", pp. 2369-2372.

Hideki Shimomura, Kazumi Aoyama, Masahiro Fujita, Digital Creatures Laboratory, Sony Corporation, "Autonomous Entertainment Robot and Speech Dialogue", pp. 21-26.

* cited by examiner

*Primary Examiner*—Anthony Knight
*Assistant Examiner*—Nathan H. Brown, Jr.
(74) *Attorney, Agent, or Firm*—Frommer Lawrence & Haug LLP; William S. Frommer; Thomas F. Presson

(57) ABSTRACT

In a learning system, a learning method, and a robot apparatus, the name of an object is obtained from the user through a dialog with the user. The object is identified based on the detection results of the predetermined plural different features of the object and the learning results of the respective features of the known object previously stored. If it is determined that the above object is a new object based on thus obtained name of the above object, the recognition results respectively based on the respective features of the above object and relation information in that the name of the known object previously stored is connected with the recognition results of the respective features of the known object respectively, the learning of the needed feature of the above object is performed, and relation information on the above object is newly stored.

24 Claims, 9 Drawing Sheets

ROBOT: MAY I ASK YOUR NAME?
USER : MY NAME IS SMITH.
ROBOT: YOUR NAME IS SMITH, ISN'T IT?
USER : YES, IT IS.
ROBOT: HELLO, MR. SMITH! HOW ARE YOU?

FIG. 9

ROBOT: SHALL YOU BE MY FRIEND?
USER : SURE.
ROBOT: THANK YOU! SO CAN I ASK SOME QUESTION ABOUT YOU?
USER : OK.
ROBOT: MR. SMITH, WHAT IS YOUR FAVORITE FOOD?

FIG. 10

ROBOT: MAY I ASK YOUR NAME?
USER : MY NAME IS SMITH.
ROBOT: YOUR NAME IS SMITH, ISN'T IT?
USER : YES, IT IS.
ROBOT: OH, MR. SMITH! I HAVE MET YOU ONCE.

FIG. 12

LEARNING SYSTEM CAPABLE OF PERFORMING ADDITIONAL LEARNING AND ROBOT APPARATUS

BACKGROUND OF THE INVENTION

1. Field of the Invention

The present invention relates to a learning system, a learning method, and a robot apparatus, and is applicable to an entertainment robot, for example.

2. Description of the Related Art

Heretofore, for instance, in the case where a recognizer such as a fingerprint recognizer, a voiceprint recognizer in a security system performs the learning of a new category, the "learning mode" in which performing the learning is explicit to the user has been used.

In this "learning mode", in the case of learning a fingerprint or a voiceprint for security as the above, the purpose that sensing information will be used for security is clear. Therefore, it is most preferable that the execution is explicit to make the user notice that information about himself/herself is being registered at present.

However, in an entertainment robot in that sensing information is used to identify that who is the user in the middle of an interaction, it is important that the user can be identified in natural interaction.

Therefore, in such entertainment robot, for instance, when in learning user's face, if the robot utters "I'll memorize your face. Please keep still.", and that the above robot is executing the learning of user's face is explicitly shown to the user, it occurs a problem that natural interaction with the user, being the primary purpose, may be disturbed.

On the other hand, in an entertainment robot that performs the learning of user's name, to make the robot perform natural interaction with the user, an idea to make the robot memorize features of the user to be connected with the user's name learnt from the user (sensing information to be connected with the name) at one time, if possible, is necessary.

However, in entertainment robots provided heretofore, the determination of the success/failure of learning is inflexible as that if sufficient data cannot be obtained in a certain time, the learning is determined to be failure. Therefore, the frequency of failures of learning occurs in a dynamic environment, and sensing information is not easily connected with the name; as a result, there has been a problem that such an interaction annoying to the user that the robot asks the user his/her name many times occurs.

Furthermore, in the entertainment robots provided heretofore, in the case where the learning must be finished without obtaining sufficient learning data, the learning at the time is determined to be failure, and all the data obtained by that learning is abandoned. Therefore, the halfway learning result cannot be used; as a result, there has been a problem that efficient learning is difficult.

Accordingly, it can be considered that in an entertainment robot, if the user can be identified in natural interaction and the failures of learning can be lessened as well as possible, the entertainment activity can be further improved.

SUMMARY OF THE INVENTION

In view of the foregoing, an object of the present invention is to provide a learning system and a learning method capable of improving the entertainment activity of a robot apparatus, and the robot apparatus.

The foregoing object and other objects of the present invention have been achieved by the provision of a learning system that comprises dialog means for obtaining the name of an object from the user through a dialog with the user, plural recognizing means for detecting a plurality of feature data of the object respectively, and for recognizing the above object based on the above detection result and the learning result of the corresponding feature data of a known object previously stored, storing means for storing relation information in that the name of the known object is connected with the recognition result of the known object by each of the above recognizing means, and control means, if determining that the above object is a new object based on the name of the above object obtained by the dialog means, the recognition result of the above object by each of the recognizing means, and the relation information stored in the storing means, for making the needed recognizing means perform the learning of the corresponding feature data of the above object, and making the storing means newly store thus obtained relation information on the above object. Therefore, this learning system can perform the learning of the name of an object through a normal dialog with the user, without being noticed the learning by the user.

Furthermore, the foregoing object and other objects of the present invention have been achieved by the provision of a learning method that comprises the first step for obtaining the name of an object from the user through a dialog with the user, and for recognizing the above object based on the detection result of a plurality of feature data of the above object and the learning results of the respective feature data of a known object, and the second step, if it is determined that the object is a new object based on the obtained name of the object, the recognition results based on the respective feature data of the above object respectively, and relation information in that the name of the known object previously stored is connected with the recognition results of the respective feature data of the above known object, for performing the learning of the needed feature data of the above object, and newly storing thus obtained relation information on the above object. According to this learning method, the learning of the name of an object can be performed through a normal dialog with the user, without being noticed by the user.

Furthermore, the foregoing object and other objects of the present invention have been achieved by the provision of a robot apparatus that comprises dialog means for obtaining the name of an object from the user through a dialog with the user, plural recognizing means for detecting a plurality of feature data of the object respectively, and for recognizing the above object based on the above detection result and the learning result of the corresponding feature data of a known object previously stored, storing means for storing relation information in that the name of the known object is connected with the recognition result of the above known object by each of the recognizing means, and control means, if determining that the object is a new object based on the name of the object obtained by the dialog means, the recognition result of the above object by each of the recognizing means, and the relation information stored in the storing means, for making the needed recognizing means perform the learning of the corresponding feature data of the above object, and making the storing means newly store thus obtained relation information on the above object. Therefore, this robot apparatus can perform the learning of the name of an object, without being noticed the learning by the user.

The nature, principle and utility of the present invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 9 is a diagram showing an example of a dialog between the robot and the user;

FIG. 10 is a diagram showing an example of a dialog between the robot and the user;

FIG. 12 is a diagram showing an example of a dialog between the robot and the user.

DETAILED DESCRIPTION OF THE EMBODIMENT

Preferred embodiments of the present invention will be described with reference to the accompanying drawings:

(1) Structure of Robot of this Embodiment

Figure 1:
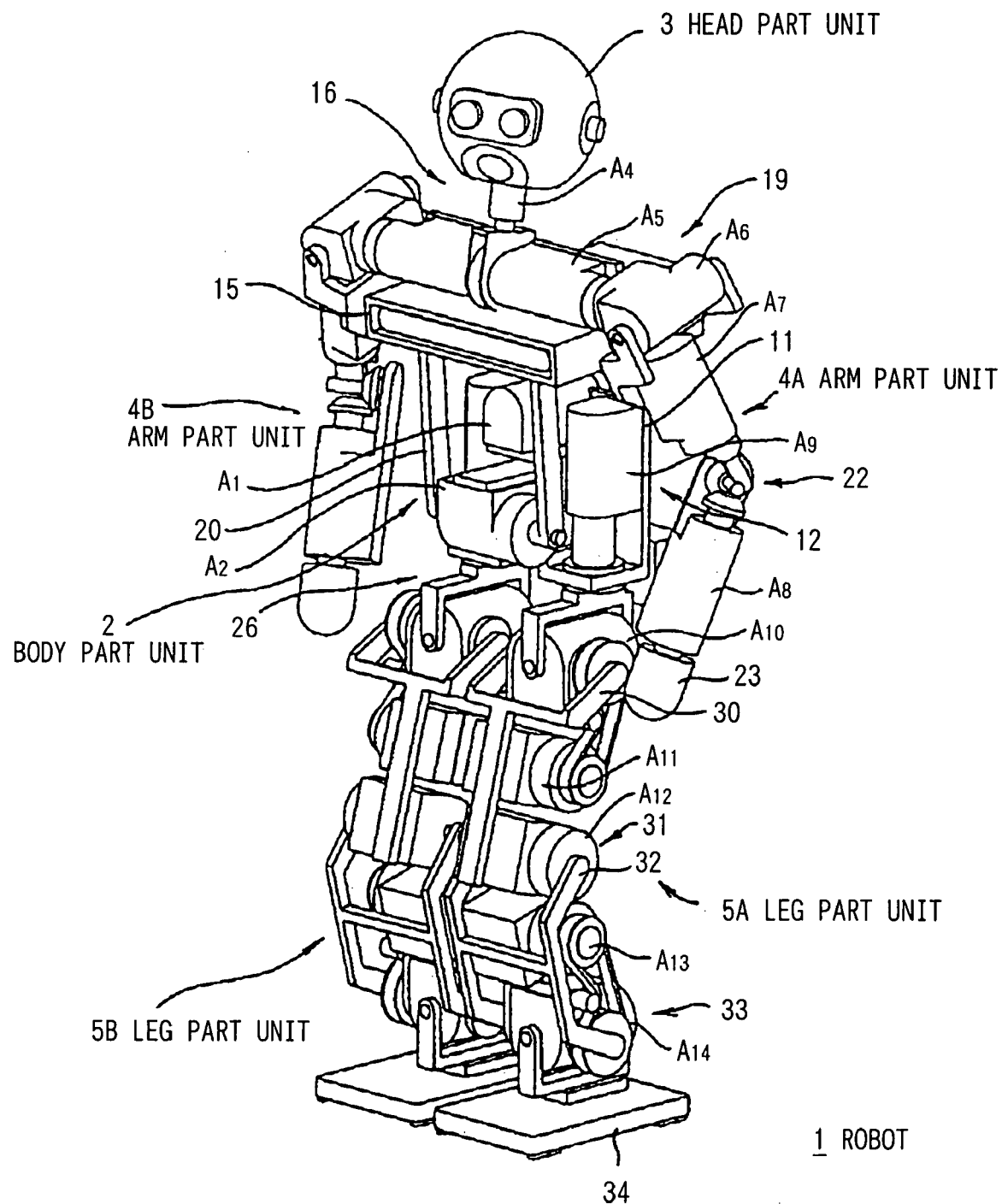
FIG. 1 is a perspective view for explaining the external structure of a robot of this embodiment.
Figure 2:
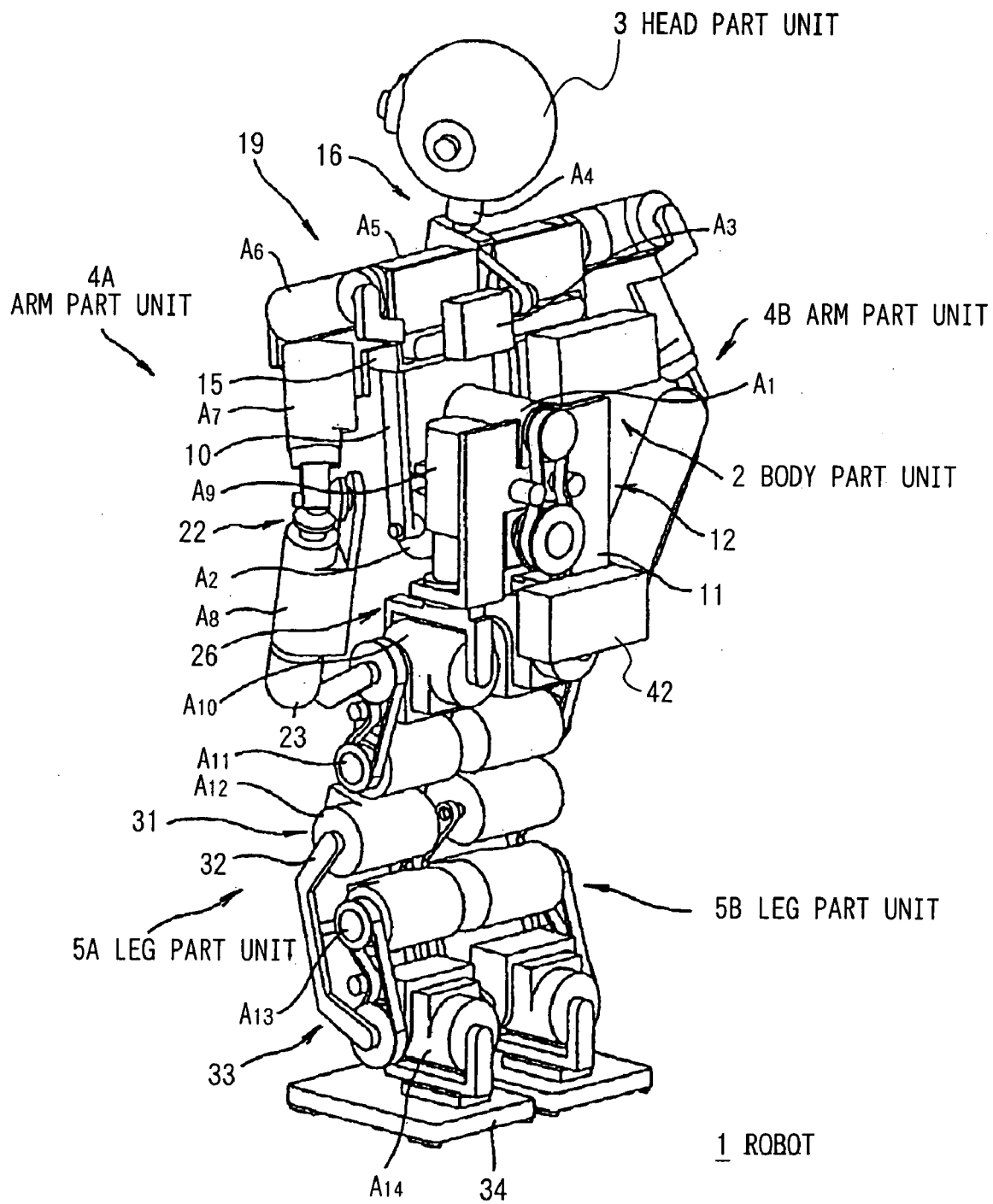
FIG. 2 is a perspective view for explaining the external structure of the robot of this embodiment.

Referring to FIGS. 1 and 2, reference numeral 1 generally shows a bipedal robot of this embodiment. In the robot 1, a head unit 3 is disposed on a body unit 2, arm units 4A and 4B having the same structure are disposed on the upper left part and the right upper part of the body unit 2 respectively, and leg units 5A and 5B having the same structure are attached to predetermined positions on the left lower part and the right lower part of the body unit 2 respectively.

Figure 3:
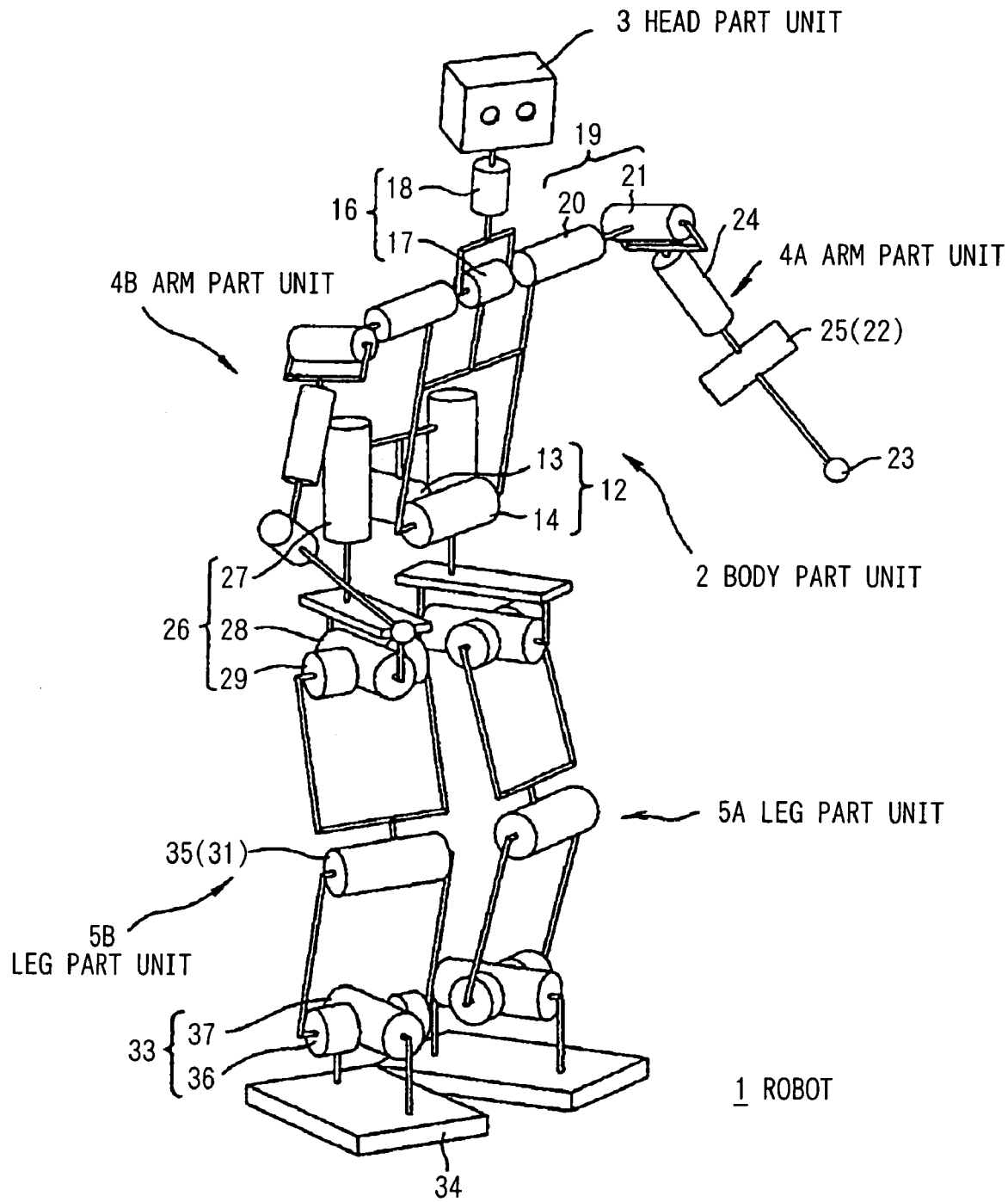
FIG. 3 is a conceptual view for explaining the external structure of the robot of this embodiment.

In the body unit 2, a frame 10 forming the upper part of a torso and an waist base 11 forming the lower part of the torso are connected via an waist joint mechanism 12. The actuators $A_1$ and $A_2$ of the waist joint mechanism 12 fixed to the waist base 11 forming the lower part of the torso are respectively driven, so that the upper part of the torso can be turned according to the respectively independent turn of a roll shaft 13 and a pitch shaft 14 that are orthogonal (FIG. 3).

The head unit 3 is attached to the top center part of a shoulder base 15 fixed to the upper ends of the frames 10 via a neck joint mechanism 16. The actuators $A_3$ and $A_4$ of the neck joint mechanism 16 are respectively driven, so that the head unit 3 can be turned according to the respectively independent turn of a pitch shaft 17 and a yaw shaft 18 that are orthogonal (FIG. 3).

The arm units 4A and 4B are attached to the right and the left ends of the shoulder base 15 via a shoulder joint mechanism 19 respectively. The actuators $A_5$ and $A_6$ of the corresponding shoulder joint mechanism 19 are respectively driven, so that the arm units 4A and 4B can be turned according to the turn of a pitch shaft 20 and a roll shaft 21 that are orthogonal (FIG. 3) respectively independently.

In this case, in each of the arm units 4A and 4B, an actuator $A_8$ forming a forearm part is connected to the output shaft of an actuator $A_7$ forming an upper arm part via an arm joint mechanism 22. A hand part 23 is attached to the end of the above forearm part.

In the arm units 4A and 4B, the corresponding forearm part can be turned according to the turn of a yaw shaft 24 (FIG. 3) by driving the actuator $A_7$, and the corresponding forearm part can be turned according to the turn of a pitch shaft 25 (FIG. 3) by driving the actuator $A_8$.

On the other hand, the leg units 5A and 5B are attached to the waist base 11 forming the lower part of the torso via a hip joint mechanism 26 respectively. The actuators $A_9$ to $A_{11}$ of the corresponding hip joint mechanism 26 are driven respectively, so that the corresponding hip joint mechanism 26 can be turned according to the turn of a yaw shaft 27, a roll shaft 28, and a pitch shaft 29 that are orthogonal (FIG. 3) respectively independently.

In this case, in each of the leg units 5A and 5B, a frame 32 forming an under thigh part is connected to the lower end of the frame 30 forming a thigh part via a knee joint mechanism 31, and a foot part 34 is connected to the lower end of the frame 32 via an ankle joint mechanism 33.

Thereby, in the leg units 5A and 5B, the underthigh part can be turned according to the turn of a pitch shaft 35 (FIG. 3) by driving an actuator $A_{12}$ forming the knee joint mechanism 31. Furthermore, the foot parts 34 can be turned according to the turn of a pitch shaft 36 and a roll shaft 37 that are orthogonal (FIG. 3) respectively independently, by driving the corresponding actuators $A_{13}$ and $A_{14}$ of the ankle joint mechanism 33 respectively.

Figure 4:
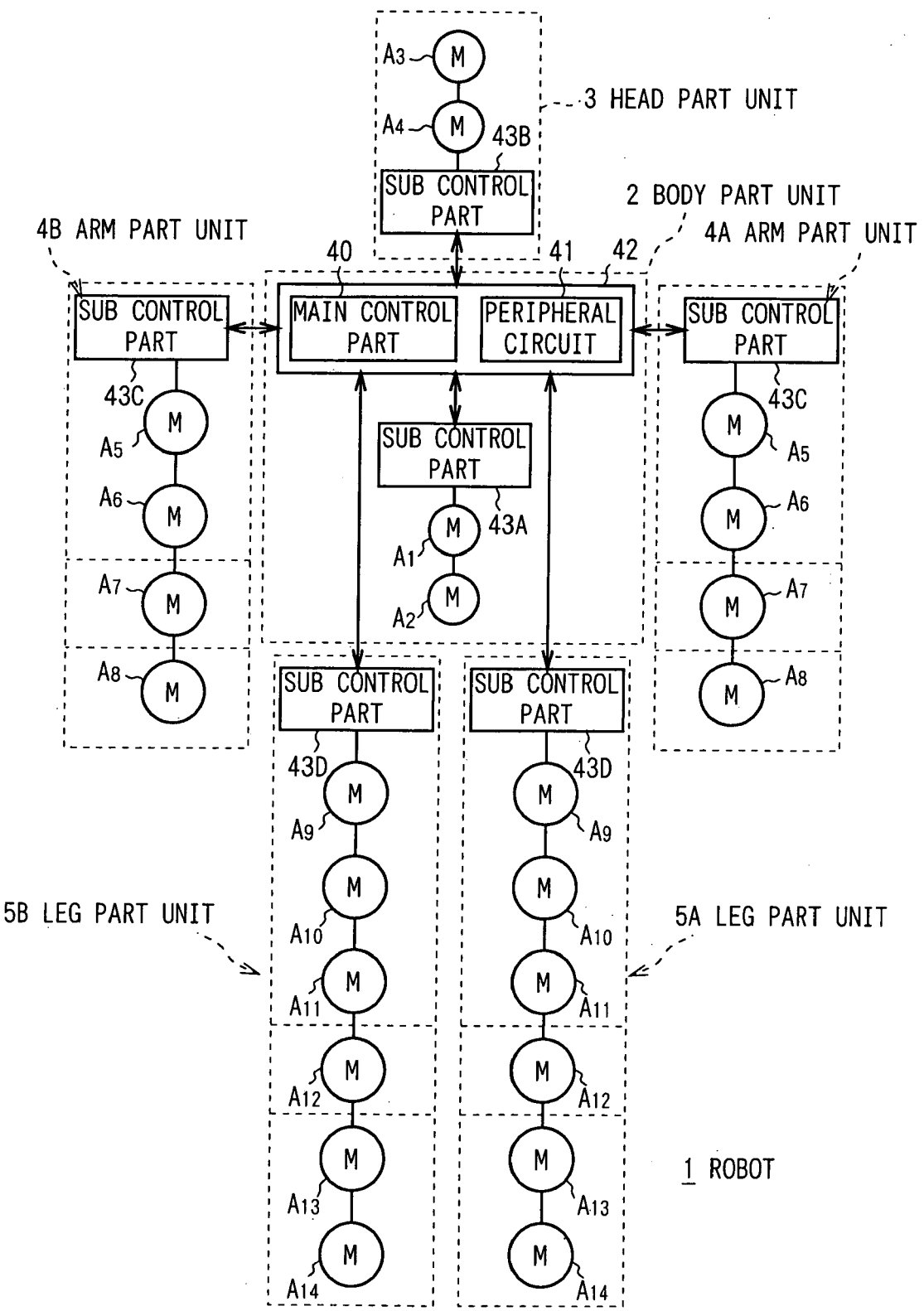
FIG. 4 is a block diagram for explaining the internal structure of the robot of this embodiment.

On the back side of the waist base 11 forming the lower part of the torso of the body unit 2, as shown in FIG. 4, a control unit 42 in which a main control part 40 for controlling the entire movements of the robot 1, a peripheral circuit 41 such as a power supply circuit and a communication circuit, a battery 45 (FIG. 5), etc. are contained in a box, is disposed.

This control unit 42 is connected to each of sub control parts 43A to 43D disposed in the configuration units (the body unit 2, head unit 3, arm units 4A and 4B, and leg units 5A and 5B), respectively. Thereby, a necessary power supply voltage can be supplied to these sub control parts 43A to 43D, and the main control part 40 can perform communication with the sub control parts 43A to 43D.

The sub control parts 43A to 43D are connected to the actuators $A_1$ and $A_2$, $A_3$ and $A_4$, $A_5$ to $A_8$, and $A_9$ to $A_{14}$ of the corresponding configuration unit respectively, so that the actuators $A_1$ to $A_{14}$ of the configuration units can be driven into the specified state according to various control commands given from the main control part 40, respectively.

Figure 5:
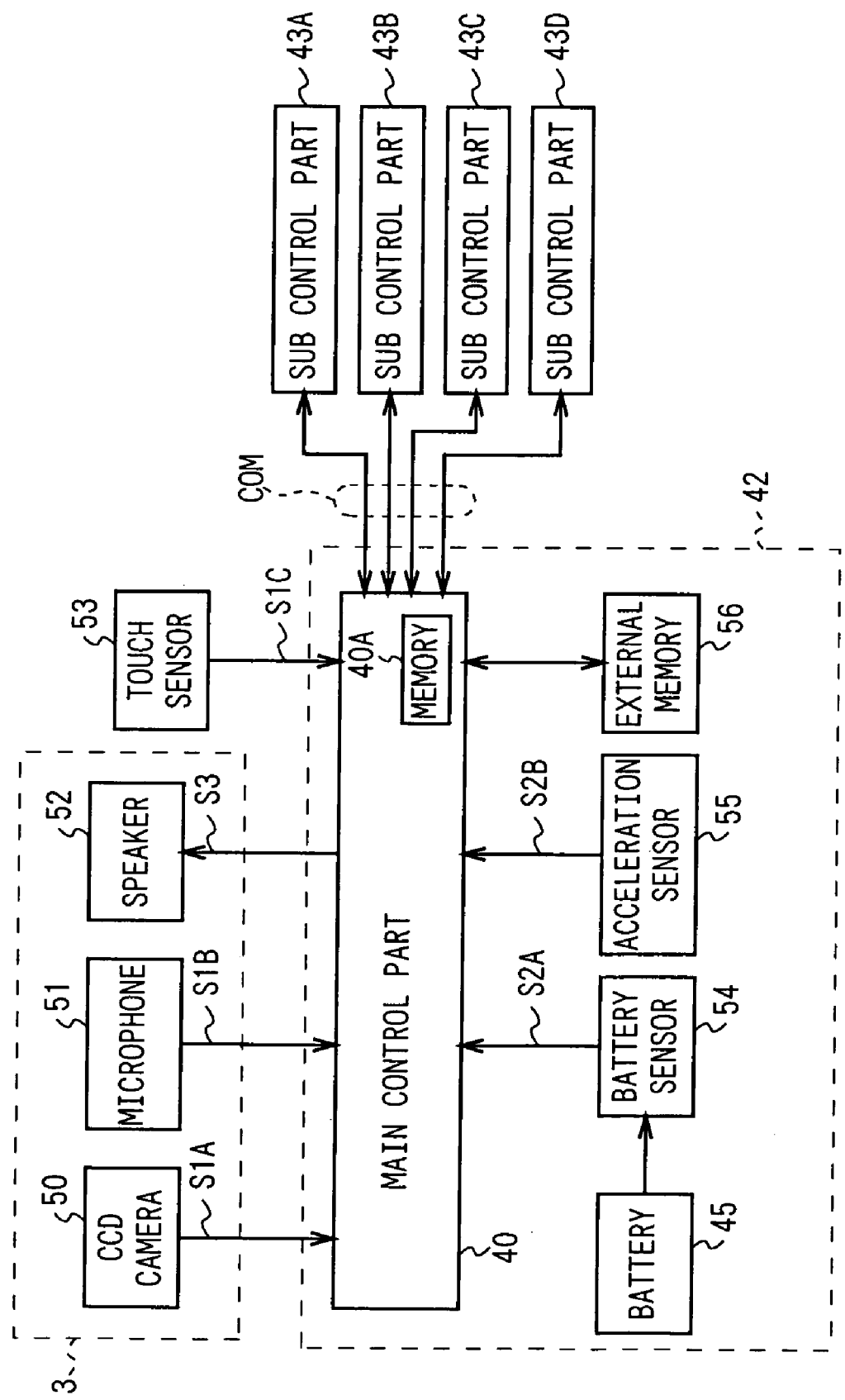
FIG. 5 is a block diagram for explaining the internal structure of the robot of this embodiment.

In the head unit 3, as shown in FIG. 5, various external sensors such as a charge coupled device (CCD) camera 50 having a function as "eye" of this robot 1, and a microphone 51 having a function as "ear", and a speaker 52 having a function as "mouse", etc., are disposed on a predetermined position, respectively. Touch sensors 53 are disposed on the bottoms of the hand parts 23 and the foot parts 34 as external sensors. Furthermore, in the control unit 42, various internal sensors such as a battery sensor 54 and an acceleration sensor 55 are disposed.

The CCD camera 50 picks up the images of surroundings, and transmits thus obtained video signal S1A to the main control part 40. The microphone 51 picks up various external sounds, and transmits thus obtained audio signal S1B to the main control part 40. And the touch sensor 53 detects a physical motion from the user, and physical contact to an external object, and transmits the detection results to the main control part 40 as pressure detecting signals S1C.

The battery sensor 54 detects the remaining quantity of the battery 45 in a predetermined cycle, and transmits the detection result to the main control part 40 as a remaining battery detecting signal S2A. And the acceleration sensor 55 detects acceleration in the three axis directions (x-, y-, and z-axes) in a predetermined cycle, and transmits the detection result to the main control part 40 as an acceleration detecting signal S2B.

The main control part 40 determines the surrounding state and the internal state of the robot 1, contact to an external object, etc., based on the video signal S1A, the audio signal S1B, and the pressure detecting signal S1C supplied from the CCD camera 50, the microphone 51, the touch sensor 53 respectively as external sensor outputs, and the remaining battery detecting signal S2A and the acceleration detecting signal S2B supplied from the battery sensor 54 and the acceleration sensor 55 respectively as internal sensor outputs.

Then, the main control part 40 determines the next movement of the robot 1 based on these determination results and various control parameters stored in an external memory 56 being loaded at the time, according to a control program previously stored in an internal memory 40A, and transmits a control command based on the determination result to the corresponding sub control part 43A–43D. As a result, the corresponding actuator $A_1$–$A_{14}$ is driven based on this control command under control by that sub control part 43A–43D. Thus, the robot 1 performs movements such as swinging the head unit 3 in all directions, raising the arm unit 4A, 4B, and walking.

The main control part 40 recognizes the content of user's utterance by speech recognizing processing based on the above audio signal S1B, and supplies an audio signal S3 based on the above recognition to the speaker 52; thereby, a synthetic voice to make a dialog with the user is emitted.

In this manner, this robot 1 can move autonomously based on the surrounding state and the internal state of the robot 1, and also can make a dialog with the user.

(2) Processing by Main Control Part 40 Relating to Name Learning Function (2-1) Configuration of Main Control Part 40 Relating to Name Learning Function Next, a name learning function built into the robot 1 will be described.

This robot 1 has the name learning function for obtaining users' names, by obtaining the name of the user through a dialog with the user and storing the above obtained name by connecting with acoustic feature data for the user's voice and shape feature data for the user's face that were detected based on the outputs from the microphone 51 and the CCD camera 50 at that time, and also by recognizing the appearance of a new user based on the above stored data, and the name of the new user, acoustic feature data for his/her voice, and shape feature data for his/her face similarly to the above. Note that, hereinafter, the user whose name, acoustic feature of the voice, and shape feature of the face have been already stored by connecting with each other is referred to as "a known user", and the user whose them have not been stored is referred to as "a new user".

This name learning function can be realized by various processing by the main control part 40.

Figures 6, 7:
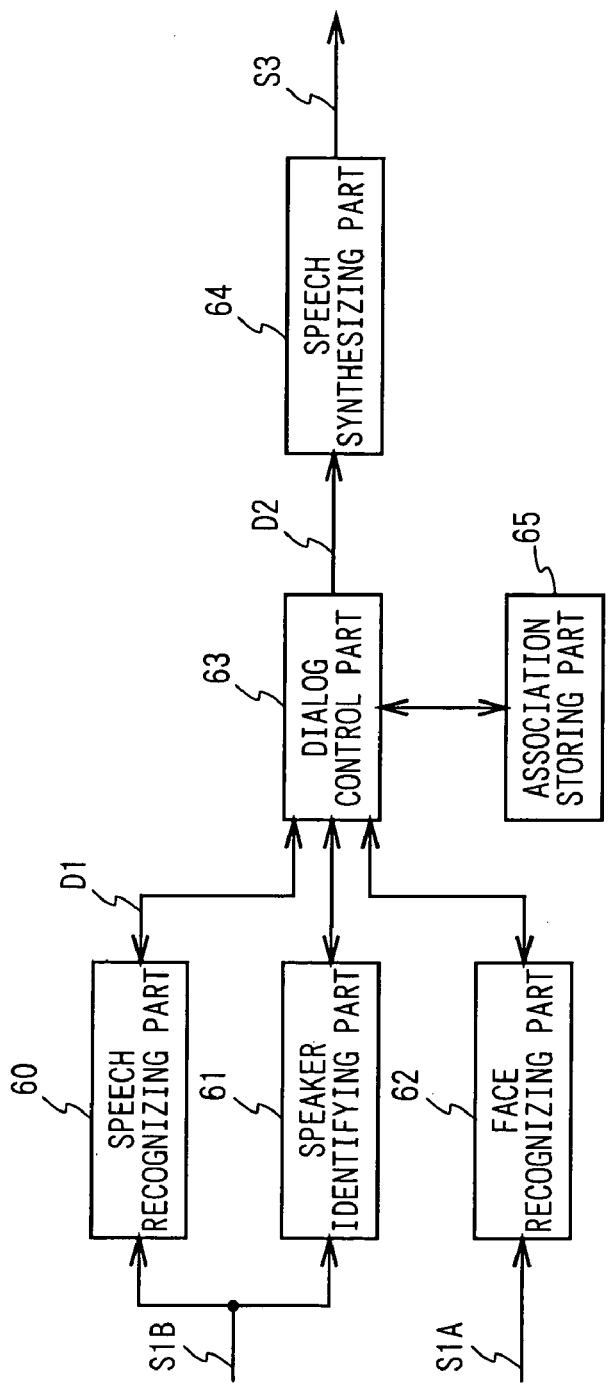
FIG. 6 is a block diagram for explaining the function of a main control part relating to a name learning function.
FIG. 7 is a conceptual view for explaining the relation between various information data in the association storing part.

Here, if classifying the contents of the processing by the main control part 40 relating to the above name learning function according to function, as shown in FIG. 6, they can be classified into a speech recognizing part 60 for recognizing the speech that the user uttered, a speaker identifying part 61 for detecting the acoustic feature of the user's voice, and also identifying the user based on thus detected acoustic feature, a face recognizing part 62 for detecting the shape feature of the user's face, and also identifying the user based on thus detected shape feature, a dialog control part 63 for controlling various controls to perform the learning of the user's name, including the control of a dialog with the user, an association storing part 65 for managing the relation among the name of a known user, the acoustic feature of his/her voice, and the shape feature of his/her face, and a speech synthesizing part 64 for generating an audio signal S3 for various dialogs under control by the dialog control part 63 and transmitting this to the speaker 52 (FIG. 5).

In this case, the speech recognizing part 60 has a function to recognize the speech included in an audio signal S1B word by word, by executing predetermined speech recognizing processing based on the audio signal S1B from the microphone 51 (FIG. 5). These recognized words are converted into character string data D1, and it is transmitted to the dialog control part 63.

The speaker identifying part 61 has a function to store audio data obtained based on the audio signal S1B from the microphone 51 for example in the internal memory 40A (FIG. 5), and a function to detect the acoustic feature of the user's voice, with the above stored audio data or the audio data obtained based on the audio signal S1B supplied from the microphone 51 in real time, by predetermined signal processing, for example, using the method described in the "Segregation of speakers for speech recognition and speaker identification" (91CH2977-7 pp. 873–876 vol. 2, 1991, IEEE).

The speaker identifying part 61 compares the detected acoustic feature data to the acoustic feature data for all the known users that have been stored at that time, sequentially. If the acoustic feature detected at that time coincides with one of the acoustic features of the known users, the speaker identifying part 61 notifies an identifier peculiar to the above acoustic feature corresponding to the acoustic feature of the above known user (hereinafter, this is referred to as "SID") of the dialog control part 63. On the contrary, if the detected acoustic feature does not coincide with any acoustic features of the known users, the speaker identifying part 61 notifies SID (=−1) meaning unrecognizable of the dialog control part 63.

Furthermore, by responding to the start command or the stop command of new learning that is given from the dialog control part 63 when the dialog control part 63 determined that the detected user is a new user, the speaker identifying part 61 detects the acoustic feature of the user's voice, with the audio data stored or obtained in real time, stores thus detected acoustic feature data by connecting with new peculiar SID, and notifies this SID of the dialog control part 63, or stops the new learning.

If the start command or the stop command of additional learning of that user is further given from the dialog control part 63 after that, the speaker identifying part 61 executes the additional learning to additionally collect the acoustic feature data for the user's voice, with the audio data stored or obtained in real time, or stops the additional learning.

Furthermore, the speaker identifying part 61 has an answering function to answer a query, when a query about the learning achievement degree of a specified user is sent from the dialog control part 63. Here, the learning achievement degree means the degree of the collection of the data that will be used to identify that user (in this embodiment, it is acoustic feature data). The learning achievement degree by the speaker identifying part 61 will be determined by a value given in a function in that the time length of the voice used to collect the acoustic feature data for the user's voice is represented by a parameter.

In this embodiment, as such learning achievement degree, the level "A" (learning could be sufficiently done: it is the level practically sufficiently usable in recognition, the level "B" (not completely sufficient: it is the level usable in recognition but it is better to perform additional learning, and the level "C" (insufficient), it is the level insufficient to use in recognition, therefore, additional learning should be performed at the next opportunity without using it in recognition, will be set as numeric values.

Therefore, if a query about the learning achievement degree of a specified user is sent from the dialog control part 63, the speaker identifying part 61 determines whether the learning achievement degree of the user is which level of "A"–"C" from the value in the function in that the time length of the voice used to collect the acoustic feature data for the user's voice has been represented by the parameter, and notifies the determination result of the dialog control part 63.

The face recognizing part 62 has a function to store picture data for learning obtained based on a picture signal from the CCD camera 50 (FIG. 5) for example in the internal memory 40A (FIG. 5), and a function to detect the shape feature of the user's face included in the picture based on the above picture data, with the above stored picture data or picture data obtained based on the picture signal S1A supplied from the CCD camera 50 in real time, by predetermined signal processing.

The face recognizing part 62 compares the detected shape feature data with the shape feature data for all the known users that have been stored at that time, sequentially. If the shape feature detected at that time coincides with one of the shape features of the known users, the face recognizing part 62 notifies an identifier peculiar to the above shape feature connected with the shape feature of the above known user (hereinafter, this is referred to as "FID") of the dialog control part 63. On the contrary, if the detected shape feature does not coincide with any of the shape features of the known users, the face recognizing part 62 notifies "FID" (=−1) meaning unrecognizable of the dialog control part 63.

Furthermore, by responding to the start command or the stop command of new learning from the dialog control part 63 when the dialog control part 63 determined that the detected user is a new user, the face recognizing part 62 detects the shape feature of the user's face with the picture data stored or obtained in real time, stores the above detected shape feature data by connecting with a new peculiar FID, and notifies this FID of the dialog control part 63, or stops the new learning.

If the start command or the stop command of the additional learning of that user is further given from the dialog control part 63 after that, the face recognizing part 62 executes the additional learning to additionally collect shape feature data for the user's face, with the picture data stored or obtained in real time, or stops the additional learning.

Furthermore, similarly to the speaker identifying part 61, the face recognizing part 62 has the answering function to answer a query, when the query about the learning achievement degree of a specified user was sent from the dialog control part 63. In the case of this embodiment, the learning achievement degree by the face recognizing part 62 is determined by the value given in a function in that the number of pieces of the pictures of the user's face based on the picture signal S1A used to collect the shape feature data for the user's face is represented by a parameter.

Therefore, if a query about the learning achievement degree of a specified user is sent from the dialog control part 63, the face recognizing part 62 determines whether the learning achievement degree is which level of "A"–"C" from the above value, and notifies the determination result of the dialog control part 63 as the learning achievement degree.

The speech synthesizing part 64 has a function to convert the character string data D1 supplied from the dialog control part 63 into an audio signal S3. Thus obtained audio signal S3 is transmitted to the speaker 52 (FIG. 5), and a voice based on the audio signal S3 is emitted from the speaker 52.

The association storing part 65 is an object for example composed of the internal memory 40A (FIG. 5) and software. As shown in FIG. 7, the name of the known user, the SID connected with the acoustic feature data for the voice of that user that has been stored in the speaker identifying part 61, and the FID connected with the shape feature data for the face of that user that has been stored in the face recognizing part 62 are stored in the association storing part 65 under control by the dialog control part 63.

At this time, they are stored in the association storing part 65 so that the name, the SID, and the FID corresponding to the same user are connected with each other. Thereby, as to the known users, the other information can be retrieved from one information (name, SID, or FID).

Furthermore, the learning achievement degree of the user by the speaker identifying part 61 is stored in the association storing part 65 corresponding to the SID of that known user, and also the learning achievement degree of the user by the face recognizing part 62 is stored in the association storing part 65 corresponding to the FID of that known user, under control by the dialog control part 63.

Note that, in the case of this embodiment, in the association storing part 65, the above stored learning achievement degree of each user by the speaker identifying part 61 and the face recognizing part 62 is updated so that the level is lowered every time when a certain time passed (for example, few days) after the registration or the last updating (for instance, "A" is lowered to "B", "B" is lowered to "C", hereinafter, this is referred to as "time attenuation of learning achievement degree").

The reason is that since the user's face and voice change as time passes, it is desirable that both of the acoustic feature data for the user's voice and the shape feature data for the user's face that will be used to identify the user by the speaker identifying part 61 and the face recognizing part 62 are updated every time when a certain time passed.

The dialog control part 63 has a speech control function to perform suitable answers and questions to the user, by sequentially supplying the required character string data D2 to the speech synthesizing part 64 based on the character string D1 from the speech recognizing part 60, the program, or the like.

The dialog control part 63 determines whether or not the user is a new user, based on the user's name obtained through the answer and the question, and the recognition results of the user by the speaker identifying part 61 and the face recognizing part 62 at that time, with referring to the information such as the name, the SID, and the FID of each of the known user stored in the association storing part 65.

If the dialog control part 63 determines that the user is a new user, it gives the speaker identifying part 61 and the face recognizing part 62 the start command and the stop command of new learning, to make the speaker identifying part 61 and the face recognizing part 62 collect and store (learn) the acoustic feature data for the user's voice and the shape feature data for the user's face respectively, and stops the learning.

Furthermore, after that, when the dialog control part 63 sent a query about the learning achievement degree of that user to the speaker identifying part 61 and the face recognizing part 62 at a predetermined timing, if an answer of "C" is obtained from one or both of them, the dialog control part 63 gives the start command and the stop command of additional learning to that or both of them to make it perform additional learning, and on the other hand, the dialog control part 63 executes control to prolong the dialog with the user during the additional learning.

On the contrary, if the dialog control part 63 determines that the user is a known user, it confirms the learning achievement degrees of that user by the speaker identifying part 61 and the face recognizing part 62 stored in the association storing part 65. If both or one of the learning achievement degree is "B" or "C", the dialog control part 63 notifies the learning achievement degree of that, and gives that speaker identifying part 61 and/or face recognizing part 62 the start command and the stop command of additional learning to make that perform and stop the additional learning.

After the completion of the above additional learning by the speaker identifying part 61 and/or the face recognizing part 62, the dialog control part 63 sends a query about the learning achievement degree of that user at the time to the speaker identifying part 61 and/or the face recognizing part 62, and updates the corresponding learning achievement degree stored in the association storing part 65, based on an answer to this from the speaker identifying part 61 and/or the face recognizing part 62.

(2-2) Concrete Processing by Dialog Control Part 63 Relating to Name Learning Function Next, the contents of concrete processing by the dialog control part 63 relating to the name learning function will be described.

Figure 8:
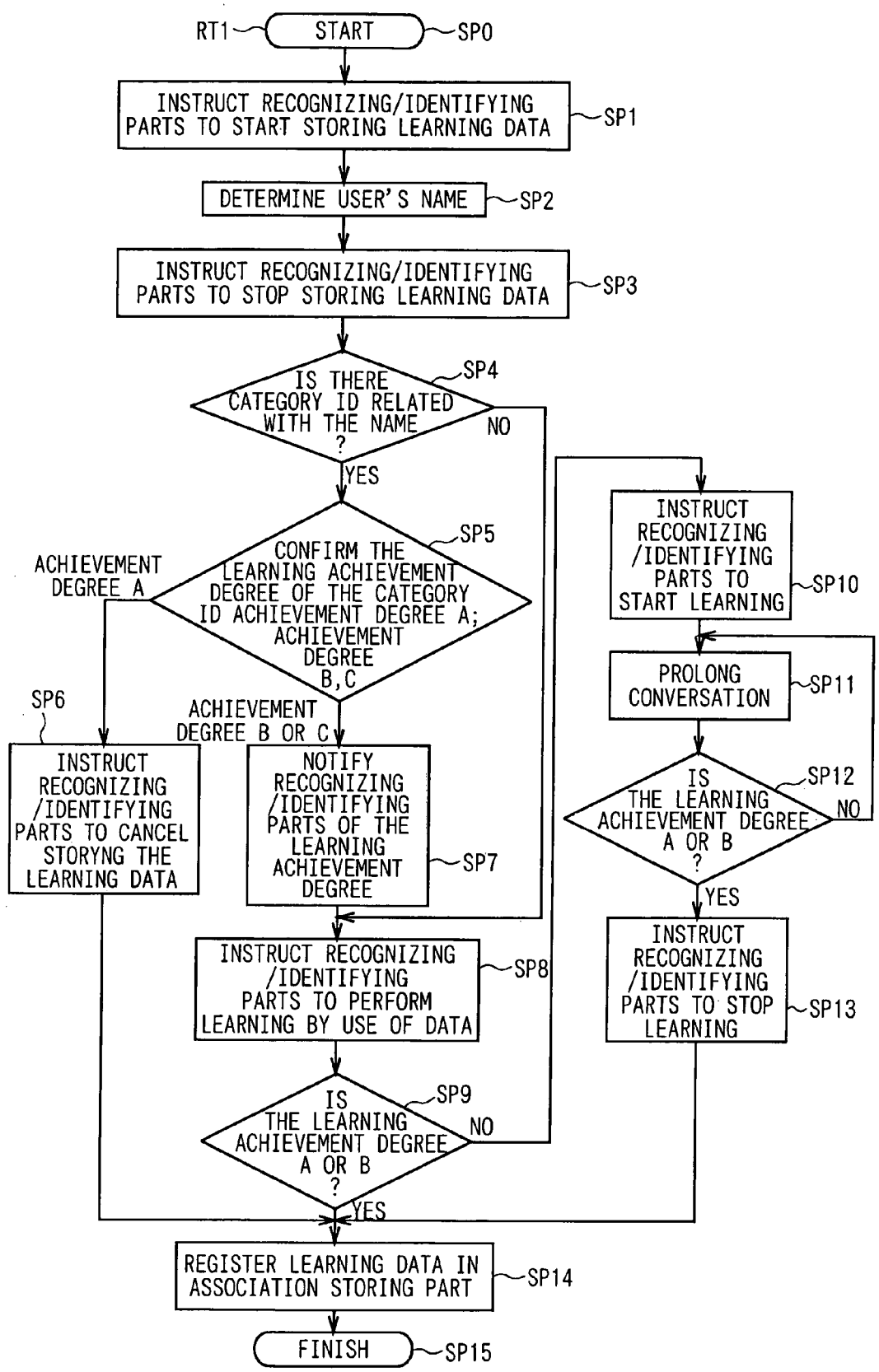
FIG. 8 is a flowchart showing the procedure of name learning processing.

The dialog control part 63 executes various processing to sequentially learn the name of a new user, based on a control program stored in the internal memory 40A according to the procedure of name learning processing RT1 shown in FIG. 8.

If the face recognizing part 62 recognizes the user's face based on the picture signal S1A from the CCD camera 50 and the FID is supplied from the above face recognizing part 62, the dialog control part 63 starts this procedure of name learning processing RT1 in step SP0. In the next step SP1, the dialog control part 63 controls the speaker identifying part 61 to make it start storing audio data based on the audio signal S1B from the microphone 51 (FIG. 5), and also controls the face recognizing part 62 to make it start storing picture data based on the picture signal S1A from the CCD camera 50.

Next, the dialog control part 63 proceeds to step SP2 to determine the name of the user. To put it concretely, the dialog control part 63 determines whether or not to be able to retrieve the user's name from among the known users' names, the SIDs, and the FIDs that have been stored in the association storing part 65 by connecting with each other, based on the FID of that user previously obtained. If the user's name can be retrieved, the dialog control part 63 transmits the character string data D2 corresponding to this to the speech synthesizing part 64. Thereby, as shown in FIG. 9, such sound that "Your name is Smith, isn't it?" is emitted to confirm whether or not the user's name coincides with the name retrieved based on the FID (in this example, Smith).

If a voice recognition result being such affirmative answer to the above question from the user that "Yes, it is." can be recognized based on character string data D1 from the speech recognizing part 60, the dialog control part 63 determines that the name of the user is "Smith".

On the contrary, if a voice recognition result being such negative answer that "No, it isn't." is recognized based on the character string data D1 from the speech recognizing part 60, the dialog control part 63 transmits character string data D2 corresponding to this. Thereby, as shown in FIG. 9, a sound to get the name of the user, such as "Can I ask your name?" is emitted.

If a voice recognition result being such answer telling his/her name to the above question that "My name is Smith." is obtained from that user, and then, to such confirmation that "Your name is Smith, isn't it?", the voice recognition result being an affirmative answer from the user is recognized based on character string data D1 from the speech recognizing part 60, the dialog control part 63 determines that the name of that user is "Smith".

If the user's name is determined in this manner, the dialog control part 63 proceeds to step SP3 to control the speaker identifying part 61 and the face recognizing part 62 to stop the processing for storing audio data by the speaker identifying part 61 based on the audio signal S1A from the microphone 51, and to make the face recognizing part 62 to stop storing picture data based on the picture signal S1A from the CCD camera 50.

Next, the dialog control part 63 proceeds to step SP4 to determine whether or not there are the SID and the FID connecting with the name of the user determined in step SP2, based on the names of the known users stored in the association storing part 65, and the SIDs and FIDs corresponding to that user.

Here, obtaining a negative result in this step SP4 means that the user is a new user whose acoustic feature data for the voice and shape feature data for the face have not been collected at all by the speaker identifying part 61 and the face recognizing part 62 respectively.

Therefore, at this time, the dialog control part 63 proceeds to step SP8 to notify a new learning start command using the audio data or the picture data stored in steps SP1 to SP3 of the speaker identifying part 61 and the face recognizing part 62. As a result, in the speaker identifying part 61 and the face recognizing part 62, new learning to newly collect and store acoustic feature data for the user's voice or shape feature data for the user's face is started with the audio data or the picture data respectively.

On the contrary, Obtaining an affirmative result in step SP4 means that the user is a known user whose acoustic feature data for the voice and/or shape feature data for the face has been already collected by the speaker identifying part 61 and/or the face recognizing part 62 respectively.

Therefore, at this time, the dialog control part 63 proceeds to step SP5 to confirm the learning achievement degree of that user by the speaker identifying part 61, that has been stored in the association storing part 65 by connecting with the SID of that user, and the learning achievement degree of that user by the face recognizing part 62, that has been stored in the association storing part 65 by connecting with the FID of that user, respectively.

Here, as a confirmation result, if that both of the learning achievement degree of that user by the speaker identifying part 61 and the face recognizing part 62 are the level "A" is confirmed, it can be determined that the speaker identifying part 61 and the face recognizing part 62 already finished collecting the acoustic feature data for the voice of the above user and the shape feature data for the face sufficient for the user identification.

Thus, in this case, the dialog control part 63 proceeds to step SP6 to notify a command that the audio data or the picture data stored in steps SP1 to SP3 should be abandoned of the speaker identifying part 61 and the dialog control part 63.

Then, the dialog control part 63 proceeds to step SP14 to update again the learning achievement degrees of that user by the speaker identifying part 61 and the face recognizing part 62 stored in the association storing part 65 to the level "A", and proceeds to step SP15 to finish this procedure of name learning processing RT1. Note that, thereafter, the robot 1 will execute various interactions such as a dialog and a dance with that user, without performing learning for that user.

On the contrary, as a confirmation result in step SP5, if it is confirmed that both or one of the learning achievement degree of that user by the speaker identifying part 61 and the face recognizing part 62 is "B" or "C", it can be determined that the speaker identifying part 61 and/or the face recognizing part 62 has not been finished collecting the acoustic feature data for the voice of the above user and/or the shape feature data for the face, sufficient for the user identification.

Thus, in this case, the dialog control part 63 proceeds to step SP7 to notify the learning achievement degrees of that speaker identifying part 61 and/or face recognizing part 62. And then, the dialog control part 63 proceeds to step SP8 to notify an additional learning start command with the audio data or the picture data stored in steps SP1 to SP3 of that speaker identifying part 61 and/or face recognizing part 62.

As a result, in that speaker identifying part 61 and/or face recognizing part 62, the learning achievement degree notified in step SP7 is set as the starting point, and the additional learning using the above audio data or the picture data is started so that from the present collecting state in that collection of the acoustic feature data for the voice of that user and/or the shape feature data for the face is not sufficient yet, this is further collected.

Then, if notice of the completion of the learning with the audio data or picture data stored in steps SP1 to SP3 is given from the speaker identifying part 61 and/or the face recognizing part 62, the dialog control part 63 proceeds to step SP9 to inquire the learning achievement degree of that user of the speaker identifying part 61 and/or face recognizing part 62 that performed the learning, and determine whether or not the answer(s) from the speaker identifying part 61 and/or face recognizing part 62 to this are/is either "A" or "B".

Here, obtaining an affirmative result in this step SP9 means that both of the speaker identifying part 61 and face recognizing part 62 or one of them which performed the learning finished collecting and storing acoustic feature data for the voice of the above user or shape feature data for the face to a degree capable of identifying that user (finished the learning sufficiently).

Therefore, at this time, the dialog control part 63 proceeds to step SP14 to update the learning achievement degree of that user by the speaker identifying part 61 and the face recognizing part 62 stored in the association storing part 65, as to the one without leaning, to the learning achievement degree confirmed in step SP5, and as to the one with learning, to the learning achievement degree obtained in step SP9. And then, the dialog control part 63 proceeds to step SP15 to finish this procedure of name learning processing RT1. Note that, thereafter, the robot 1 performs various interactions such as a dialog and a dance with that user, without performing learning for that user.

On the contrary, obtaining a negative result in step SP9 means that at least one of the speaker identifying part 61 and/or face recognizing part 62 which performed the learning does not yet collect and store the acoustic feature data for the voice of the above user or the shape feature data for the face to a degree capable of identifying that user (does not finish the learning sufficiently).

At this time, the dialog control part 63 proceeds to step SP10 to notify the start command of additional learning using audio data obtained based on the audio signal S1B supplied from the microphone 51 in real time or picture data obtained based on the picture signal S1A supplied from the CCD camera 50 in real time of that speaker identifying part 61 and/or face recognizing part 62.

As a result, in that speaker identifying part 61 and/or face recognizing part 62, the learning achievement degree notified in step SP7 of the dialog control part 63 is set as the starting point, and the additional learning to additionally collect and store the acoustic feature data for the voice of that user or the shape feature data for the face of that user is started, using the above audio data or picture data.

Then, the dialog control part 63 proceeds to step SP11 to execute the processing to prolong the dialog with that user. To put it concretely, under control by the dialog control part 63, the robot 1 actively talks to that user from the robot 1 so that the user does not notice the robot 1 performing learning for him/her, for example, as shown in FIG. 10, as "Shall you be my friend?" "Thank you! So can I ask some questions about you?" "Mr. Smith, what is your favorite food?" Furthermore, the dialog control part 63 transmits the character string data D2 for providing a subject, to the speech synthesizing part 64, while selecting the contents according to the speech recognition result of the contents of user's utterance by the speech recognizing part 60.

Then, the dialog control part 63 proceeds to step SP12 at a predetermined timing to inquire the learning achievement degree of that user of the speaker identifying part 61 and/or face recognizing part 62 to which it notified the additional learning start command, and determine whether or not the answer(s) from both of them of that to the inquiry are/is either "A" or "B".

If a negative result is obtained in this step SP12, the dialog control part 63 returns to step SP11, and then, it repeats the loop of steps SP11-SP12-SP11 until an affirmative result is obtained in this step SP12.

Presently, if an affirmative result is obtained in step SP12 by that both of the speaker identifying part 61 and the face recognizing part 62 finished collecting and storing the acoustic feature data for the voice of the above user or the shape feature data for the face to a degree capable of identifying that user, the dialog control part 63 proceeds to step SP13 to notify an additional learning stop command of the speaker identifying part 61 and/or face recognizing part 62 that is performing the additional learning.

Then, the dialog control part 63 proceeds to step SP14 to update the learning achievement degrees of that user by the speaker identifying part 61 and the face recognizing part 62 stored in the association storing part 65, as to the one without the additional leaning in steps SP10 to SP13, to the learning achievement degree confirmed in step SP5 or SP9, and as to the one with the additional learning in steps SP10 to SP13, to the learning achievement degree obtained in step SP12. And then, the dialog control part 63 proceeds to step SP15 to finish this procedure of name learning processing RT1. Note that, thereafter, the robot 1 executes various interactions such as a dialog and a dance with that user, without performing learning for that user.

In this manner, in this robot 1, under control by the dialog control part 63, new leaning for a new user and additional learning for a known user can be performed. Thereby, the learning of the name of the new user can be sequentially performed, by connecting with the acoustic feature data for the voice and the shape feature data for the face.

(2-3) Error Processing in Name Learning Processing

Next, in the name learning processing according to the above procedure of name learning processing RT1, the processing in the case where the dialog control part 63 cannot help stopping the learning for the user in the middle of the learning, because of user's leaving during the learning or the like will be described.

As the cases where the dialog control part 63 cannot help stopping the learning for the user in the middle of the learning, the five patterns can be considered as follows:

[1]: the case where in step SP2 in the procedure of name learning processing RT1, the learning must be stopped before the user's name is determined;

[2]: the case where in steps SP1 to SP3 in the procedure of name learning processing RT1, after the speaker identifying part 61 and the face recognizing part 62 started storing the audio data or the picture data respectively, they cannot help stopping the learning before its completion;

[3]: the case where in steps SP4 to SP7 in the procedure of name learning processing RT1, the dialog control part 63 cannot help stopping the learning before the speaker identifying part 61 and the face recognizing part 62 start the learning with the stored audio data or picture data respectively;

[4]: the case where in steps SP8 and SP9 in the procedure of name learning processing RT1, the speaker identifying part 61 and the face recognizing part 62 cannot help stopping the new learning or the additional learning with the stored audio data or picture data, during the above learning respectively; and

[5]: the case where in steps SP10 to SP13 in the procedure of name learning processing RT1, the speaker identifying part 61 and the face recognizing part 62 cannot help stopping the additional learning with the audio signal S1B or picture signal S1A obtained in real time, during the above learning respectively.

Note that, hereinafter, these patterns are referred to as "learning impossible pattern [1]–[5]" respectively.

In these cases, it also can be considered that the learning for the user is determined as failure, and the learning audio data or picture data stored to that time in the speaker identifying part 61 and the face recognizing part 62 respectively is abandoned, or the acoustic feature data for the voice of the user and the shape feature data for the face collected to that time by the speaker identifying part 61 and the face recognizing part 62 respectively is abandoned. However, this wastes the above collected data.

Therefore, in this robot 1, in case of the aforementioned learning impossible pattern [1], the learning audio data and picture data stored to that time is abandoned. However, in case of the aforementioned learning impossible patterns [2] and [3], the dialog control part 63 makes the needed speaker identifying part 61 and/or face recognizing part 62 perform the learning by using the audio data and picture data stored to that time. If the learning achievement degree(s) become(s) "A" or "B" by the above learning, the above learning is treated as effective, and if the learning achievement degree (s) are/is still "C", the above learning is treated as ineffective Furthermore, in this robot 1, in case of the aforementioned learning impossible patterns [4] and [5], according to the learning achievement degrees by the speaker identifying part 61 and the face recognizing part 62 at the time when they could not help stopping the learning, if the above learning achievement degrees are "A" or "B", the above learning is treated as effective, and if the learning achievement degree is "C", the above learning is treated as ineffective.

Figure 11:
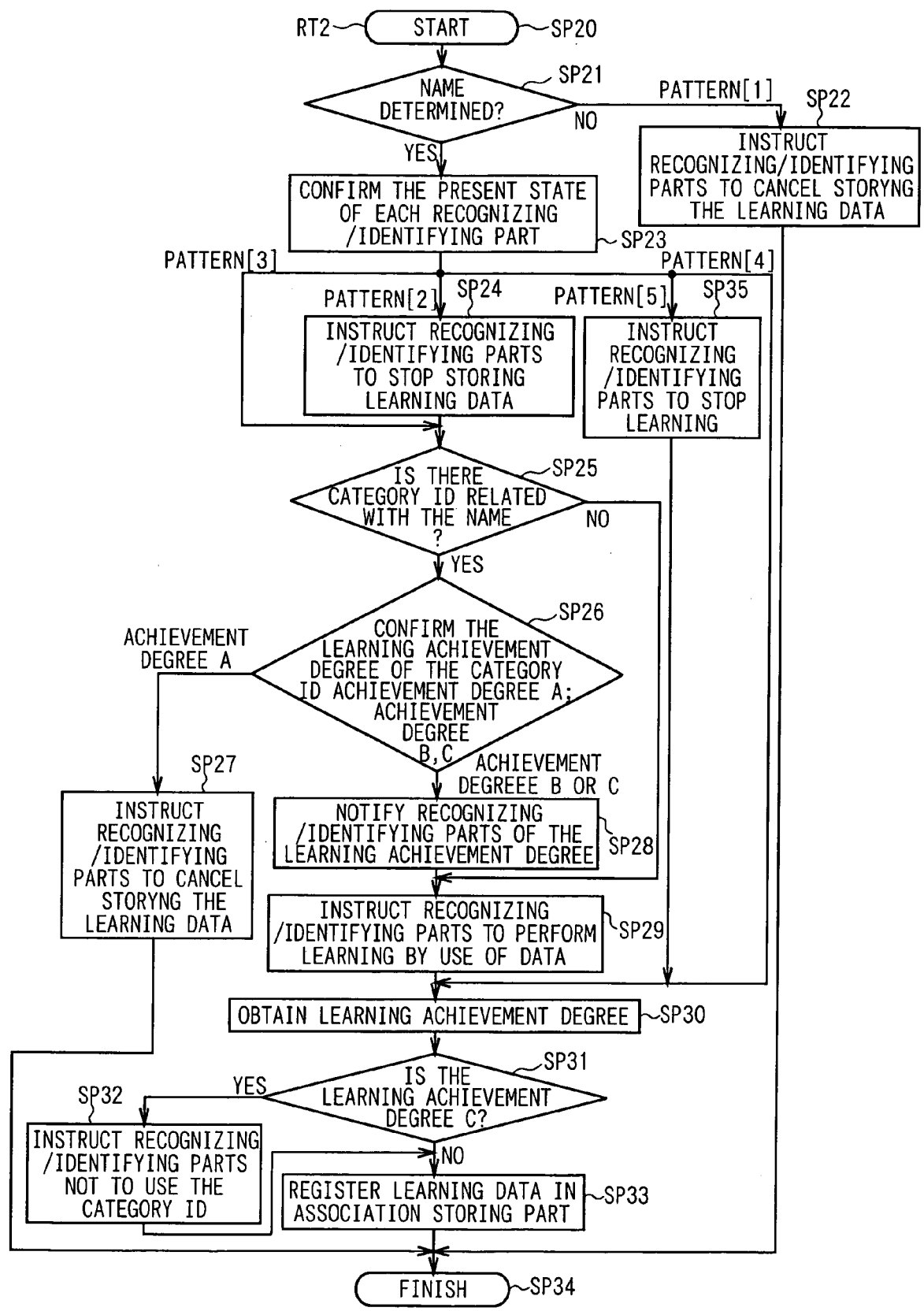
FIG. 11 is a flowchart showing the procedure of error processing.

Here, such error processing is performed according to the procedure of error processing RT2 shown in FIG. 11 under control by the dialog control part 63.

Practically, when in executing the aforementioned procedure of name learning processing RT1, if a predetermined state by that the learning for the user cannot be continued, such that the error notice that the user being the identifying object became impossible is given from the speaker identifying part 61, occurs, the dialog control part 63 finishes the procedure of name learning processing RT1, and starts this procedure of error processing RT2 in step SP20. In the next step SP21, the dialog control part 63 determines whether or not the name of the user who was the object until then was determined.

Obtaining a negative result in this step SP21 means that in step SP2 in the procedure of name learning processing RT1, the situation that the learning must be stopped before the user's name is determined occurred by the above error (in case of the learning impossible pattern [1]). At this time, the dialog control part 63 proceeds to step SP22 to notify a command to abandon the learning audio data or picture data that has been stored from the start of the procedure of name learning processing RT1 to that time, of the speaker identifying part 61 and the face recognizing part 62 respectively. And then, the dialog control part 63 proceeds to step SP34 to finish this procedure of error processing RT2.

On the contrary, if an affirmative result is obtained in this step SP21, the dialog control part 63 proceeds to step SP23 to give a command to request the speaker identifying part 61 and the face recognizing part 62 to notify the state of itself, and confirm their present states based on replies from them to the request.

In this step SP23, if the dialog control part 63 confirms that the speaker identifying part 61 and the face recognizing part 62 started storing the audio data or the picture data respectively, and they do not finish it yet (in case of the learning impossible pattern [2]), the dialog control part 63 proceeds to step SP24 to notify a command to stop the storing of the learning audio data or picture data of the speaker identifying part 61 and the face recognizing part 62 respectively. And then, the dialog control part 63 performs the processing of steps SP25 to SP29 similarly to the aforementioned steps SP4 to SP8 in the procedure of name learning processing RT1.

If the dialog control part 63 completes the above processing of steps SP25 to SP29, it proceeds to step SP30 to inquire the learning achievement degree for the user of the speaker identifying part 61 and the face recognizing part 62, and obtain the learning achievement degrees for the user by the speaker identifying part 61 and the face recognizing part 62. And then, the dialog control part 63 proceeds to step SP31 to determine whether or not both of thus obtained the learning achievement degree by the speaker identifying part 61 and the face recognizing part 62 are "C".

Here, obtaining a negative result in this step SP31 means that both of the speaker identifying part 61 and the face recognizing part 62 could collect the acoustic feature data for the voice of the user or the shape feature data for the face respectively, to a degree capable of identifying the above user.

Therefore, at this time, the dialog control part 63 proceeds to step SP33, and if the above user is a new user, the dialog control part 63 makes the association storing part 65 store SID and FID newly issued from the speaker identifying part 61 and the face recognizing part 62 respectively, the name of that user determined in step SP2 in the procedure of name learning processing RT1, and the learning achievement degree for that user by the speaker identifying part 61 and the face recognizing part 62, obtained in step SP30 in the procedure of error processing RT2, by connecting them with each other as the above.

On the contrary, if the above user is a known user, the dialog control part 63 updates the learning achievement degrees for that user by the speaker identifying part 61 and the face recognizing part 62, stored in the association storing part 65, to the present learning achievement degrees for that user by the speaker identifying part 61 and the face recognizing part 62, obtained in step SP30. And then, the dialog control part 63 proceeds to step SP34 to finish this procedure of error processing RT2.

Obtaining a negative result in step SP31 means that with respect to that user, one or both of the speaker identifying part 61 and the face recognizing part 62 do not still finish collecting acoustic feature data for the voice of the user or the shape feature data for the face to a degree capable of identifying the above user.

At this time, the dialog control part 63 proceeds to step SP32 to give the speaker identifying part 61 and the face recognizing part 62 an instruction to not use that acoustic feature data for the voice or shape feature data for the face connected with the SID and the FID in speaker identification processing and face recognition processing after that, respectively. As a result, in the speaker identifying part 61 and the face recognizing part 62, the above acoustic feature data for the voice and shape feature data for the face will not be used in speaker identification processing and face recognition processing respectively, until the learning achievement degree of that user becomes "B" or "A" by additional learning after this.

Then, the dialog control part 63 proceeds to step SP33, and if the above user is a new user, as described above, the dialog control part 63 makes the association storing part 65 store SID and FID newly issued from the speaker identifying part 61 and the face recognizing part 62 respectively, the name of the user determined in step SP2 in the procedure of name learning processing RT1, and the learning achievement degrees for that user by the speaker identifying part 61 and the face recognizing part 62, obtained in step SP30 in this procedure of error processing RT2, by connecting them with each other as described above.

On the contrary, if the above user is a known user, the dialog control part 63 updates the learning achievement degrees for the user by the speaker identifying part 61 and the face recognizing part 62, stored in the association storing part 65, to the present learning achievement degrees for that user by the speaker identifying part 61 and the face recognizing part 62, obtained in step SP30. And then, the dialog control part 63 proceeds to step SP34 to finish this procedure of error processing RT2.

In this manner, in case of this robot 1, even if the learning achievement degree(s) for the user by the speaker identifying part 61 and/or the face recognizing part 62 are "C", the name of the above user obtained at that time, corresponding SID and FID, and the learning achievement degree(s) for that user by the speaker identifying part 61 and/or the face recognizing part 62 are stored in the association storing part 65 by connecting them with other (steps SP31 to SP33). Therefore, for example, as shown in FIG. 12, when the user having that name was recognized again, the robot 1 can emit such sound that "I have met you once."

Furthermore, in step SP32, even if an instruction not to use the acoustic feature data for the voice of the user and the shape feature data for the face, collected at that time, is given from the dialog control part 63 to the speaker identifying part 61 and/or the face recognizing part 62, as described above in steps SP7 and SP8 in the procedure of name learning processing RT1, the next additional learning for the above user by the speaker identifying part 61 and/or the face recognizing part 62 is started from the middle of the processing by supposing the presence of the above collected acoustic feature data for the voice of the user and shape feature data for the face. Thereby, learning can be efficiently performed by these speaker identifying part 61 and face recognizing part 62.

On the other hand, in step SP23, as the present states of the speaker identifying part 61 and the face recognizing part 62, if the dialog control part 63 confirms that although storing of the audio data or the picture data was finished, learning using this has not been started yet (in case of the learning impossible pattern [3]), the dialog control part 63 proceeds to step SP25 to determine whether or not the SID or FID connected with the above name have been stored in the association storing part 65 based on the name of that user determined in step SP2 in the procedure of name learning processing RT1. And then, the dialog control part 63 performs the processing in steps SP26 to SP34 similarly to the above.

In step SP23, as the present states of the speaker identifying part 61 and the face recognizing part 62, if the dialog control part 63 confirms that they are performing the learning with the stored audio data or picture data (in case of the learning impossible pattern [4]), the dialog control part 63 proceeds to step SP30 to inquire the learning achievement degree for that user of the speaker identifying part 61 and the face recognizing part 62, and obtain the learning achievement degrees for that user by the speaker identifying part 61 and the face recognizing part 62. And then, the dialog control part 63 performs the processing in steps SP31 to SP34 similarly to the above.

Furthermore, in step SP23, as the present states of the speaker identifying part 61 and the face recognizing part 62, if the dialog control part 63 confirms that they are performing the additional learning with audio data based on the audio signal S1B supplied from the microphone 51 in real time or picture data based on the picture signal S1A supplied from the CCD camera 50 in real time (in case of the learning impossible pattern [5]), the dialog control part 63 proceeds to step SP35 to notify an additional learning stop command of that speaker identifying part 61 and/or face recognizing part 62.

And then, the dialog control part 63 proceeds to step SP30 to inquire the learning achievement degree for that user of the speaker identifying part 61 and the face recognizing part 62, and obtain the learning achievement degrees for that user by the speaker identifying part 61 and the face recognizing part 62. And then, the dialog control part 63 performs the processing in steps SP31 to SP34 similarly to the above.

In this manner, in this robot 1, when in performing the learning of the user, even if the dialog control part 63 cannot help stopping the learning, the user can be identified using the learning audio data or picture data, collected until that, and the acoustic feature data for the voice of the user and the shape feature data for the face, under control by the dialog control part 63.

(3) Operation and Effect of this Embodiment

According to the above configuration, in this robot 1, the name of a new user is obtained through a dialog with the user. The above name is stored by connecting with acoustic feature data for voice of the user and shape feature data for the face, detected based on output from the microphone 51 (FIG. 5) and the CCD camera 50 (FIG. 5) respectively. The appearance of a further new user whose name has not been obtained is recognized based on such stored various data, and the name of the new user, the acoustic feature of his/her voice and the shape feature data of face are obtained and stored similarly to the above, so that the learning of the user's name is performed.

Therefore, in this robot 1, the learning of the name of a new user, the acoustic feature of the user's voice and the shape feature of the face can be naturally performed through dialog with the user as people usually do, without being noticed by the user.

When such learning is performed, in this robot 1, learning audio data for learning the acoustic feature of the voice of a user being an object and learning picture data for learning the shape feature of the face of the user has been previously stored in the speaker identifying part 61 and the face recognizing part 62 respectively before the name of the above user is determined, and the learning is performed with this audio data and picture data. Therefore, there is a possibility that even if the situation that the robot 1 cannot help stopping the learning for that user in the middle of the learning occurred, the robot 1 can continue the learning for that user. Thus, the learning of the user can be further effectively performed.

Even if a robot cannot help stopping the learning of the user in the middle of the learning, acoustic feature data for the user's voice and shape feature data for the face being the learning results until then, is stored, and the next learning for that user is started from the halfway state. Therefore, the learning can be effectively performed.

Furthermore, in this robot 1, if the learning with audio data for the voice of the user being an object and picture data for the face, previously stored, is not sufficiently performed, the learning is continued by prolonging the dialog with the user. Therefore, there is a possibility that the learning for the user can be completed by one dialog. Thus, the occurrence of such interaction annoying for the user that a robot asks the user about his/her name again and again can be effectively prevented.

According to the above configuration, the name of a new user is obtained through a dialog with the user. The above name is stored by connecting with acoustic feature data for the voice of the user and shape feature data for the face, detected based on output from the microphone 51 and the CCD camera 50 respectively. The appearance of a further new user whose name has not been obtained is recognized based on such stored various data, and the name of the new user, the acoustic feature of his/her voice and the shape feature of the face are obtained and stored similarly to the above, so that the learning of the user's name is performed. Thereby, the learning of the name of a new user, the acoustic feature of the voice of the user, and the shape feature of the face of the user can be naturally performed through a dialog with the user as people usually do, without being noticed by the user. Thus, a robot capable of remarkably improving the entertainment activity can be realized.

(4) Other Embodiments

In the aforementioned embodiment, it has dealt with the case where the present invention is applied to the bipedal robot 1 structured as shown in FIG. 1. However, the present invention is not only limited to this but also can be widely applied to robot apparatuses in various forms other than this, and various apparatuses other than the robot apparatus.

In the aforementioned embodiment, it has dealt with the case where the learning object is a human being (user). However, the present invention is not only limited to this but also can be applied to the case where an object other than the human being is set as an object of name learning.

In this case, in the aforementioned embodiment, it has dealt with the case where the person is identified from the acoustic feature of the voice of the person being an object and the shape feature of the face respectively, and whether or not the person is a new person is determined based on these recognition results. However, the present invention is not only limited to this. Instead of this or in addition to this, whether or not the person is a new person may be identified based on the recognition results by recognizing plural kinds of various features of the person, by that an individual is biologically identifiable, other than that, such as build, a figure, an odor, respectively. Furthermore, in the case where an object of name learning is an other than the human being, the object may be identified by plural kinds of features identifiable the object, such as color, shape, a pattern, size, respectively, and whether or not the object is a new object may be determined based on these recognition results. In these cases, it is good to provide plural recognizing means for detecting the predetermined different feature of the object respectively, and identifying the above object based on the above detection result and corresponding feature data for known objects previously stored.

In the aforementioned embodiment, it has dealt with the case where a learning achievement degree is expressed by three levels of "A"–"C". However, the present invention is not only limited to this. The learning achievement degree may be expressed by two levels or more than three levels.

In the aforementioned embodiment, it has dealt with the case where for example in the additional learning described above as the processing in steps SP10 to SP13 in the procedure of name learning processing RT1, the speaker identifying part 63 simply prolongs the dialog. However, the present invention is not only limited to this. When in prolonging a dialog with the user, the dialog control part 63 may perform the processing to make a dialog with the user so that the recognizing means (speaker identifying part 61 and/or face recognizing part 62) insufficient in the learning for the user can easily perform learning. Thereby, additional learning can be further effectively performed.

Practically, for instance, if it is in case of this embodiment, and if the part that will perform the additional learning is the speaker identifying part 61, it is good to prolong the dialog while making a dialog to make the user speak as much as possible, and if it is the face recognizing part 62, it is good to prolong the dialog while making a dialog to make the user move his/her head, in order to obtain the pictures of the user's face from the directions as many as possible, such as "Can you turn the right?".

In the aforementioned embodiment, it has dealt with the case where the association storing part 65 performs time attenuation to each of the stored learning achievement degrees for example every few days. However, the present invention is not only limited to this. The time interval of time attenuation may be other than few days. Furthermore, such time attenuation may be performed under management by the dialog control part 63.

In the aforementioned embodiment, it has dealt with the case where the dialog means for obtaining the name of an object from the user through a dialog with the user, and the control means, if it is determined that the object is a new object based on the name of the object obtained by the above dialog means, the recognition results of the above object by each recognizing means, and relation information stored in the storing means, for making the recognizing means requiring learning perform the learning of the corresponding feature data of the above object, and making the storing means newly store relation information on the above object, are formed by the dialog control part 63 being one function module. However, the present invention is not only limited to this. They may be formed in different modules.

Furthermore, in the aforementioned embodiment, it has dealt with the case where the storing means for storing the relation information in that the name of a known user and the recognition results of the known users by the recognizing/identifying parts (the speech recognizing part 60, speaker identifying part 61, and face recognizing part 62) are connected with each other, is composed of the internal memory 40A and the software. However, the present invention is not only limited to this. For example, the part having the function to store relation information in the above storing means may be replaced by means having another storing function other than the internal memory 40A, such as a compact disk, that is freely rewritable data.

According to the present invention as described above, in a learning system, dialog means for obtaining the name of an object from the user through a dialog with the user, plural recognizing means for detecting a plurality of feature data of the object respectively, and for recognizing the above object based on the above detection result and the learning result of the corresponding feature of a known object previously stored, storing means for storing relation information in that the name of the known object is connected with the recognition result of the above known object by each of the recognizing means, and control means, if determining that the object is a new object based on the name of the object obtained by the dialog means, the recognition result of the above object by each of the recognizing means, and the relation information stored in the storing means, for making the needed recognizing means perform the learning of the corresponding feature data of the above object, and making the storing means newly store thus obtained relation information on the above object, are provided. Thereby, the learning of the name of an object can be performed through a normal dialog with the user, without being noticed by the user. Thus, a learning apparatus capable of improving the entertainment activity can be realized.

According to the present invention, in a learning method, the first step for obtaining the name of an object from the user through a dialog with the user, and for recognizing the above object based on the detection result of a plurality of feature data of the object and the learning results of the respective features of a known object previously stored, and the second step, if it is determined that the object is a new object based on the obtained name of the object, the recognition results based on the respective feature data of the above object respectively, and relation information in that the name of the known object previously stored is connected with the recognition results of the respective feature data of the above known object, for performing the learning of the needed feature data of the above object, and newly storing thus obtained relation information on the above object, are provided. Thereby, the learning of the name of an object can be performed through a normal dialog with the user, without being noticed by the user. Thus, a learning method capable of improving the entertainment activity can be realized.

Furthermore, according to the present invention, in a robot apparatus, dialog means for obtaining the name of an object from the user through a dialog with the user, plural recognizing means for detecting a plurality of feature data of the object respectively, and for recognizing the above object based on the above detection result and the learning result of the corresponding feature data of a known object previously stored, storing means for storing relation information in that the above name of the known object is connected with the recognition result of the above known object by each of the above recognizing means, and control means, if determining that the object is a new object based on the name of the object obtained by the dialog means, the recognition result of the above object by each of the recognizing means, and the relation information stored in the storing means, for making the needed recognizing means requiring the learning perform the learning of the corresponding feature data of the above object, and making the storing means newly store thus obtained relation information on the above object, are provided. Thereby, the learning of the name of an object can be performed without being noticed by the user. Thus, a robot apparatus capable of improving the entertainment activity can be realized.

While there has been described in connection with the preferred embodiments of the present invention, it will be obvious to those skilled in the art that various changes and modifications may be aimed, therefore, to cover in the appended claims all such changes and modifications as fall within the true spirit and scope of the present invention.

What is claimed is:

1. A learning system comprising:
    dialog means for obtaining the name of an object from a user through a dialog with said user;
    plural recognizing means for detecting a plurality of feature data of said object respectively, and for recognizing the object based on the detection result and the learning result of said corresponding feature data of a known object previously stored;
    storing means for storing relation information, said name of said known object is connected with the recognition result of the known object by each of said recognizing means; and
    control means, for determining that if said object is a new object based on the name of said object obtained by said dialog means, the recognition result of the object by each of said recognizing means, and said relation information stored in said storing means, for making said recognizing means perform the learning of said corresponding feature data of the object, and making said storing means store the relation information, wherein said control means manages the learning achievement degrees of said known object by said respective recognizing means, and wherein if said control means determines that said object is a known object based on the name of said object obtained by said dialog means, the control means makes said predetermined recognizing means perform the learning of said corresponding feature of the object, and updates said corresponding relation information according to the obtained new learning achievement degree.

2. The learning system according to claim 1, wherein:

each of said recognizing means starts collecting learning data for performing the learning of said corresponding feature of the object before said dialog means obtains said name of said object, and performs the learning of said corresponding feature of said object with the collected learning data.

3. The learning system according to claim 2, wherein:

if each of said recognizing means does not collect a predetermined amount of said learning data, the recognizing means performs the learning of said corresponding feature of said object with the collected learning data.

4. The learning system according to claim 1, wherein:

if the learning of said corresponding feature of said object is stopped in the middle of the learning, each of said recognizing means stores a halfway learning result until that time, and starts the next learning of said corresponding feature of the object from the halfway point.

5. The learning system according to claim 1, wherein:

if the learning of said user by one or more of said recognizing means is insufficient, said dialog means executes the processing to prolong the dialog with said user.

6. The learning system according to claim 5, wherein:

said dialog means executes the processing to make a dialog so that said recognizing means is insufficient in the learning of said object.

7. The learning system according to claim 1, wherein:

said control means makes said predetermined recognizing means start the learning of said corresponding feature of the object, according to the present learning achievement degree.

8. The learning system according to claim 7, wherein:

said storing means stores data for the present learning achievement degree, and manages the learning achievement degrees.

9. A learning method comprising:

obtaining a name of an object from a user through a dialog with said user, recognizing the object based on a detection result of a plurality of feature data of said object and a learning results of features of said known object previously stored;

determining whether said object is a new object based on the obtained name of said object, the recognition results based on said respective feature data of the object, and relation information that is connected with the recognition results of said feature data of the known object;

performing the learning of said feature data;

storing the obtained relation information;

managing the learning achievement degrees of said respective features;

determining whether said object is a known object based on the obtained name of said object, if so, the recognition results of said respective features of the object, and said stored relation information, the learning of said predetermined feature determined based on said learning achievement degrees of said respective features of the object is performed; and updating the corresponding relation information according to the obtained new learning achievement degree.

10. The learning method according to claim 9, wherein:

collecting learning data for performing the learning of said respective features of the object is started before said name of said object is obtained; and the learning of said respective features of said object is performed with the collected learning data.

11. The learning method according to claim 10, wherein:

if a predetermined amount of said learning data is not collected, the learning of said corresponding feature of said object is performed with the collected learning data.

12. The learning method according to claim 9, wherein:

if the learning of said corresponding feature of said object is stopped during the learning, the halfway learning result is stored; and additional learning of said corresponding feature of the object is started from the halfway point.

13. The learning method according to claim 9, wherein:

if the learning of one or more of said features of said user is insufficient, the processing to prolong the dialog wit said user is performed.

14. The learning method according to claim 13, wherein:

to prolong the dialog with said user, the processing to make a dialog so that the learning of said feature, insufficient in the learning, of said object is performed.

15. The learning method according to claim 9, wherein:

the learning of said predetermined feature of said object determined based on said learning achievement degrees of said features of said object is started from the state according to the present learning achievement degree of the feature.

16. The learning method according to claim 9, wherein:

time attenuation is performed to said learning achievement degrees.

17. A robot apparatus comprising:

dialog means for obtaining a name of an object from a user through a dialog with said user;

plural recognizing means for detecting one or more predetermined different features of said object, and for recognizing the object based on the detection result and the learning result of said corresponding feature of said known object previously stored;

storing means for storing relation information such that said known object is connected with the recognition result of the known object by each of said recognizing means; and control means for determining that said object is a new object based on the name of said object obtained by said dialog means, the recognition result of the object by each of said recognizing means, and said relation information stored in said storing means, learning said corresponding feature of the object, and storing relation information on the object, wherein said control means manages the learning achievement degrees of said known object by said recognizing means, and wherein if said control means determines that said object is a known object based on the name of said object obtained by said dialog means, the recognition results of the object by said recognizing means, and said relation information stored in said storing means, the recognizing means perform the learning of said corresponding feature of the object, and updates said corresponding relation information according to obtained new learning achievement degree.

18. The robot apparatus according to claim 17, wherein:
each of said recognizing means, collects learning data for performing the learning of said corresponding feature of the object before said dialog means obtains said name of said object, and performs the learning of said corresponding feature of said object with the collected learning data.

19. The robot apparatus according to claim 18, wherein:
when said recognizing means does not collect a predetermined amount of said learning data, the recognizing means performs the learning of said corresponding feature of said object with the collected learning data.

20. The robot apparatus according to claim 17, wherein:
when the learning of said corresponding feature of said object is stopped during learning, each of said recognizing means stores a halfway learning result until that time, and starts the next learning of said corresponding feature of the object from the halfway point.

21. The robot apparatus according to claim 17, wherein:
if the learning of said user by one or all of said recognizing means is insufficient, said dialog means executes the processing to prolong the dialog with said user.

22. The robot apparatus according to claim 21, wherein:
said dialog means executes the processing to make a dialog so that said recognizing means insufficient in the learning of said object easily perform that learning.

23. The robot apparatus according to claim 17, wherein:
said recognizing means start the learning of said corresponding feature of the object from the state according to a present learning achievement degree of the object by the recognizing means.

24. The robot apparatus according to claim 23, wherein:
said storing means stores data for the present learning achievement degree by each of said recognizing means, and manages the learning achievement degrees; and
said control means or said storing means performs time attenuation to said learning achievement degrees.

* * * * *